Sept. 3, 1957 R. B. COLT 2,805,410
AIR SPEED INDICATOR
Filed June 14, 1955 3 Sheets-Sheet 1

INVENTOR
RUTGER B. COLT
BY George Sipkin
B. L. Zangwill
ATTORNEYS

Sept. 3, 1957 R. B. COLT 2,805,410
AIR SPEED INDICATOR
Filed June 14, 1955 3 Sheets-Sheet 2

INVENTOR
RUTGER B. COLT
BY George Sipkin
B. L. Zangwill
ATTORNEY

Sept. 3, 1957 R. B. COLT 2,805,410
AIR SPEED INDICATOR
Filed June 14, 1955 3 Sheets-Sheet 3

INVENTOR
RUTGER B. COLT
BY George Sipkin
B. L. Zangwill
ATTORNEYS

United States Patent Office 2,805,410
Patented Sept. 3, 1957

2,805,410

AIR SPEED INDICATOR

Rutger B. Colt, Baltimore, Md., assignor, by mesne assignments, to the United States of America as represented by the Secretary of the Navy Application June 14, 1955, Serial No. 515,567

5 Claims. (Cl. 340—282)

The present invention relates to an air speed indicator and more particularly to an indicator adapted for use by a landing signalling officer in determining safe landing speeds for aircraft.

The function of a landing signalling officer aboard an aircraft carrier is to convey information to a pilot and to direct the landing of the plane. The speed of the plane in making the landing is critical, and in the past, the officer, by means of an indicator knew only the speed at which the plane was approaching the ship. As the plane decelerated, the officer relied on experience in making instant decisions as to the disposition of the plane, including its speed, in determining whether or not to order a landing.

The present invention eliminates much of the guesswork formerly made by the landing signalling officer by providing apparatus which directly shows whether the plane is within a range of safe landing speeds. The apparatus includes pointers showing an optimum landing speed and its upper and lower limits. A display of colored lights is also incorporated in the structure for showing at a glance whether the aircraft is within the speed range conducive to safe landing operations.

An object of the invention is to provide an indicator for showing safe landing speeds of an aircraft.

Another object of the invention is the provision of an auxiliary lighting system for readily showing optimum and dangerous operating speeds of an aircraft as it makes an approach for a landing.

Still another object of the invention is the provision of a plurality of adjustable indicating pointers which establish a speed range in which an aircraft can safely make a landing.

Other objects and many of the attendant advantages of this invention will be readily appreciated as the same becomes better understood by reference to the following detailed description when considered in connection with the accompanying drawings wherein:

Fig. 5 is a schematic diagram of an electrical system used in controlling the indicating light system.

Figure 1:
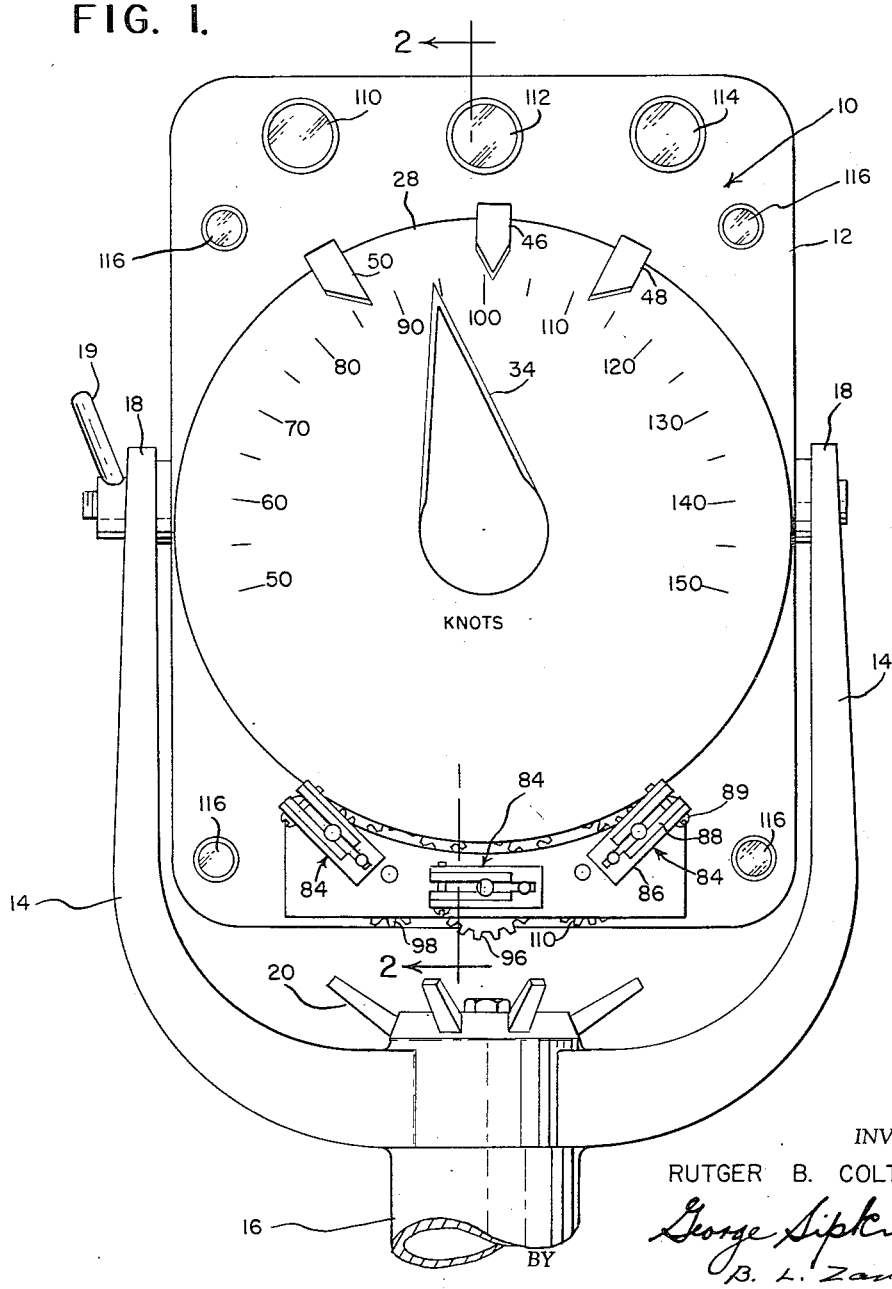
Fig. 1 is a view in front elevation of an indicator, with the cover plate removed, showing the arrangement of parts in the apparatus.
Figure 2:
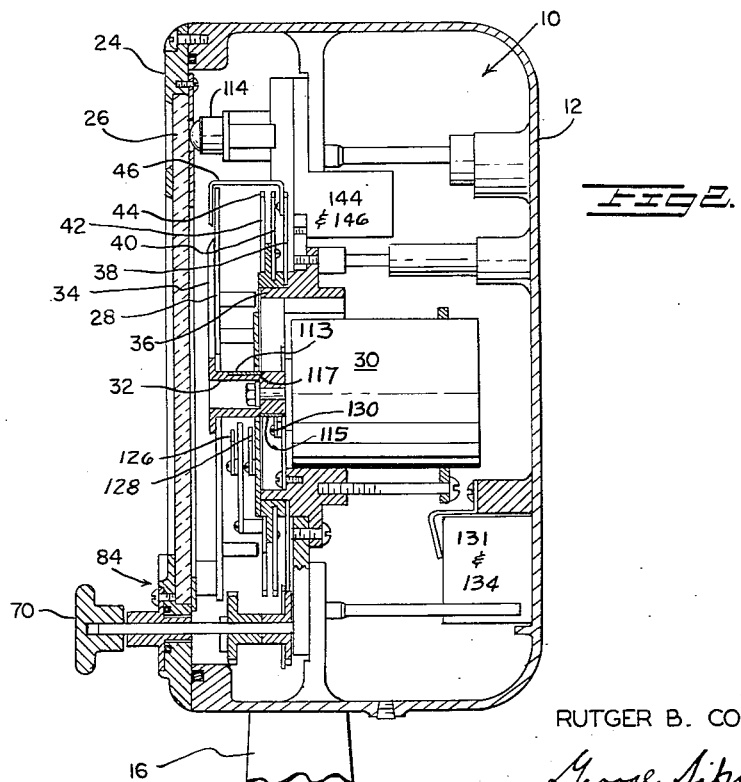
Fig. 2 is a view in side elevation, partly in section, taken on the lines 2—2 of Fig. 1.
Figure 3:
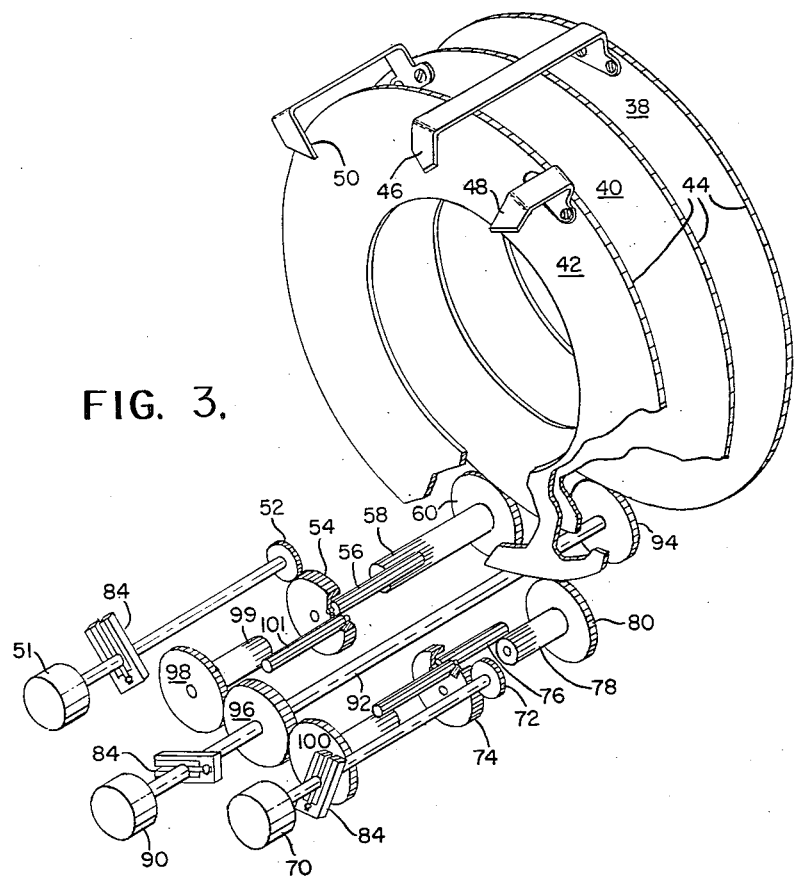

Referring now to the drawings, wherein like reference characters designate like or corresponding parts throughout the several views, there is shown in Figs. 1 and 2 an air speed indicator 10 enclosed by a housing 12 which is pivotally mounted in a yoke 14 rotatably supported by a stanchion 16. The housing 12 is held in the ends 18 of yoke 14 and is equipped with a clamp handle 19 for locking the housing in any selected position 30° either side of the vertical. The yoke 14 is capable of rotation in a half circle on an axis extending through the stanchion and the speed indicator and is adjustably attached to the stanchion by a yoke locking nut 20.

A cover 24 holds a protective glass 26 fixed over the face of a dial 28 calibrated in knots. Positioned within the housing is a synchro 30 connected to any suitable synchronous speed-indicating system and having a following shaft 32 to which is attached a needle or pointer 34 coacting with dial 28 for showing indications of speed. Rotatably mounted on portion 36 of housing 12 are a plurality of discs 38, 40 and 42, each being provided with peripheral teeth 44, Fig. 3, for a purpose hereinafter described. Pointers 46, 48 and 50 respectively attached to each of the discs, are bent in such fashion as to have the indicating end thereof extend over the face of dial 28, as shown in Figs. 1 and 2. The pointers 46, 48, and 50 are utilized for establishing an optimum landing speed with its upper and lower limits. In operation, the pointer 46 represents an optimum landing speed for the aircraft; however, if the needle 34 appears within the area between pointers 48 and 50, the aircraft can also be landed at these speeds. In the event the needle 34 is beyond the upper limit 48 or below the lower limit 50, the indication would be that the plane is traveling at either too high or too low a rate of speed and the landing signalling officer would wave the plane off for a second approach.

Figure 3:
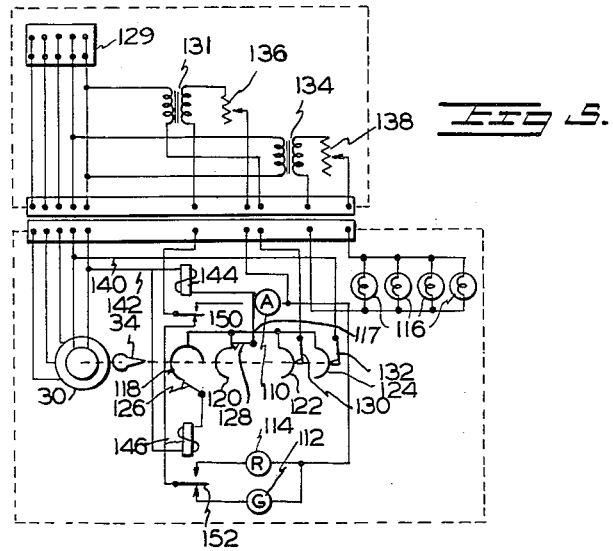
Fig. 3 is a schematic view of a gearing arrangement utilized in obtaining adjustment of the indicating pointers.
Figure 4:
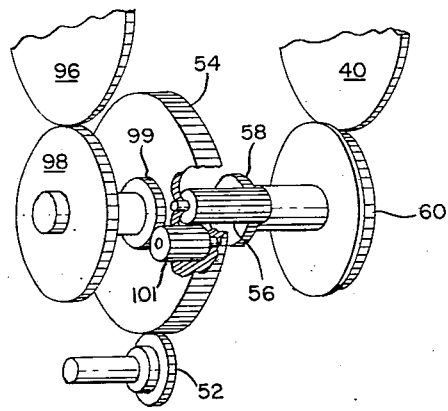
Fig. 4 is a perspective view of a portion of the gearing system shown in Fig. 3.

As aforementioned, the pointers are movable in order to provide flexibility for varying operating conditions and to account for the different landing speeds of various types of planes. The upper and lower limit pointers are movable individually or all three pointers can be moved simultaneously. Referring now to Figs. 1, 3 and 4 disclosing apparatus for achieving the above-described movements, individual adjustment of the low limit disc 40 is achieved by turning knob 51 and its shaft connected pinion gear 52. The latter imparts movement to gear 54 and pinion gears 56 and 58 which rotates gear 60 meshing with teeth 44 on the outer surface of the low limit disc 40. Movement of the knob 51 in one direction or the other will obtain a corresponding rotary movement of pointer 50 to any selected position on the dial. Similarly, the high limit disc 42 is rotated in the same manner; i. e., by turning knob 70 and its connected pinion gear 72 which imparts motion to gear 74 and the associated pinions 76 and 78, thence to gear 80 meshing with teeth 44 of disc 42.

It will be noted that when the low limit disc 40 is actuated by knob 51, the other gears in the intermediate disc and high limit disc trains are not rotated by virtue of the application of a braking effect applied to the shafts by a brake 84. As shown in Fig. 1, each shaft is supplied with a brake which comprises a U-shaped member 86 having brake shoe 88 adapted for contact with the shaft. Application of force to the shaft by a brake shoe is achieved by tightening a screw 89 movable in a side of member 86.

As shown in Fig. 3, the intermediate pointer disc is rotated by turning knob 90 which transmits movement directly through shaft 92 and gear 94 to disc 38. Simultaneous adjustment of all three pointers is obtained by virtue of the gear 96 which respectively meshes with gears 98 and 100 for transmitting movement through the associated pinions into the low and high limit disc gear system.

In operation, assuming that it is desired to move the low limit pointer 50, the left hand knob 51, which is normally braked against rotation by the brake 84, is turned manually thereby turning pinion 52. Since the intermediate knob 90 is locked against rotation by means of its brake shoe, the gear 98 and its associated pinion 99 are locked against rotation. Such arrangement causes the pinion 101, pinion 56 and pinion 58 to remain locked and thus the rotation of gear 54, caused by gear 52, is transmitted directly to the shaft of gear 60, which in turn rotates the disc carrying the pointer 50.

A similar differential is utilized to adjust the high limit pointer 48. When it is desired to move the intermediate pointer 46 and thus carry with it the high and low limit pointers 48 and 50, the middle knob 90 is manually revolved, thereby causing rotation of gear 98 and its associated pinion 99. Since the lower limit knob 51 is locked by means of its brake shoe 84, the gears 52 and 54 are locked against rotation. This permits pinions 101, 56 and 58 to rotate and thus transmit the motion of intermediate knob 90 to gear 60 to turn the low limit pointer 50 concurrently with adjustment of the intermediate pointer 46. In like manner, the high limit pointer 48 is moved to the new position.

It is to be understood that the intermediate pointer could be eliminated without departing from the scope of the invention, thereby leaving two pointers both independently adjustable along the dial with respect to one another and with means to move the two together along the dial without affecting the differential spacing therebetween.

Referring now to Figs. 1 and 2 it will be seen that three indicating lights 110, 112, 114 respectively colored amber, green and red are provided on the front face of the speed indicator. These lights are used as an auxiliary measure in providing the landing signalling officer with a readily detectable means for determining whether or not the plane is within a safe operating speed for landing. The arrangement of parts in the electrical circuit for controlling energization of lamps 110, 112, and 114 will be described hereinafter; however, the function of the lights is as follows: So long as the indicating needle 34 is within the speed range of 87 through 112 knots, as shown in particular in this figure, the green light 112 will glow thereby indicating that the landing speed of the plane is within a safe range. In the event the needle drops below the low limit pointer 50, the amber light 110 will glow, and likewise, when the needle is above high limit pointer 48 the red light 114 will glow thereby showing dangerous approach speeds. An important feature is that only one light will glow at any one time.

In order to achieve the proper functioning of indicating lights 110, 112 and 114 there is provided imbedded in the periphery of shaft 32 a plurality of interconnected strips forming (Fig. 2) a first semi-cylindrical conducting portion 113, a second semi-cylindrical conducting portion 115 displaced laterally from and 180° from portion 113, and an intermediate cylindrical conducting portion 117 connecting portions 113 and 115. Referring to Fig. 5 conducting portion 113 is schematically represented by strips 118 and 120, portion 115 by strips 122 and 124, and portion 117 by the conductor connecting strips 118 and 120 and 122 and 124. Referring to Fig. 2, and to Fig. 5 showing the schematic diagram of the system for controlling operation of the lights, there is shown a terminal board 129 adapted for receiving electrical power from an exterior source. Transformers 131 and 134, having low voltage secondaries including rheostats 136 and 138, respectively control the supply of current to indicating lamps 110, 112, and 114, and to dial illumination lamps 116. A plurality of contactors or brushes 126, 128, 130 and 132 are adapted to ride on the strips whereby to complete electrical circuits to lamps 110, 112 and 114. Brushes 126 and 128 are mounted on discs 40 and 42 and are adapted to ride on portion 113 comprising strips 118 and 120, and brushes 130 and 132, the latter of which is not shown in Fig. 2, are mounted on portion 36 of housing 12 and are adapted to ride on portion 115 comprising strips 122 and 124. As is apparent brushes 130 and 132, which supply power to the strips, are in fixed position with respect to shaft 32 while brushes 126 and 128 are adjustable in position with respect to shaft 32 since they are mounted on discs 40 and 42. Hence as will be seen the brushes or contactors are arranged in a manner such that the proper light will glow when the indicating needle is within the area controlled by the light. Current for actuating switches in the lighting circuits is supplied through conductors 140, 142 to two parallel connected relays 144 and 146.

Referring to Fig. 5 the positions of the strips and brushes shown, assuming clockwise rotation of 30 depicts a circuit condition at zero speed. Assuming that a ¼ turn of shaft 32 brings the indicating needle to the lower landing limit, and a ¾ turn to the upper landing limit, i. e. the pointers 50 and 48 are so set that a ¼ turn of shaft 32 brings the indicating needle to the lower landing limit pointer 50, and a ¾ turn to the upper landing limit pointer 48, it may be seen that during the first ¼ turn brushes 128, 130 and 132 will contact strips 120, 122 and 124; during the second ¼ turn only brush 128 will contact its strip 120; during the third ¼ turn only brush 126 will contact its strip 118, and finally during the fourth ¼ turn brushes 126, 130 and 132 will contact strips 118, 130 and 132. The operation then is as follows: From the zero position of the brushes as shown in Fig. 5 up to the lower landing limit pointer 50 (¼ turn from the position shown) which is indicative of speeds too low for landing, contactor 128 will be contacted by the conductor strip 120 thereby closing the circuit and causing actuation of relay 144 power being supplied through brushes 130 and 132 through strips 122 and 124. Current at this time will flow through conductor 142 to relay 144, contactor 128, conducting strips 120 and 124, and through normally closed contact 132 to the return line 140. Actuation of relay 144 will pull switch 150 to its up position opening the green light circuit and closing the secondary circuit of transformer 132 and causing amber light 110 to glow. The red light circuit at this time is open since contactor 126 is off strip 118 during the ¼ turn up to low limit pointer 40, hence only the amber light will indicate. As the indicating needle continues to move above the low limit pointer 50, the relay 144 will be deenergized and switch 150 will drop to its lower position even though brush 128 still contacts strip 120, since power brushes 130 and 132 move off strips 122 and 124 for the interval between ¼ and ¾ turn; hence the green light circuit will be reestablished to indicate safe landing speeds for the interval between the low limit pointer 50 to the upper limit pointer 48 (¼ turn to ¾ turn). While contactor 126 is on strip 118 during the ½ to ¾ interval, no power is delivered thereto to energize relay 146 to close the red light circuit. As the needle passes the upper limit pointer power is again supplied to strips 130 and 132, energizing contactor 126. Relay 146 will then be energized and will establish through picked up switch 152 a circuit from the secondary of transformer 131 to red lamp 114 thereby indicating that the speed of the aircraft is too high for a safe landing.

Obviously many modifications and variations of the present invention are possible in the light of the above teachings. It is therefore to be understood that within the scope of the appended claims the invention may be practiced otherwise than as specifically described.

What is claimed is:

1. A landing speed indicator for use with aircraft comprising a housing containing a relatively fixed calibrated dial and a shaft supported indicating needle adapted for connection to an air speed responsive device for registering speed of said aircraft, adjustable means positioned around said dial for showing a safe landing speed, said adjustable means comprising a plurality of spaced movable discs positioned in parallel relationship adjacent said dial, said discs and dial being co-axial, a pointer respectively attached to each of said discs, each pointer having an extending portion with an end thereof bent over the face of said dial, driving means connected with each of said discs for moving said attached pointers to selected positions over said dial face, means connected to said driving means for selectively moving all or a predetermined number only of said discs and attached pointers, the last said means comprising a plurality of separate driving units, said discs having geared teeth about their peripheries, said teeth on each disc being operatively associated with said driving units, and frictional braking means connected to each driving unit and normally in braking condition thereon, and indicating means dependent in operation upon said adjusting means.

2. A landing speed indicator for use with aircraft comprising a housing containing a calibrated dial and a shaft supported indicating needle for said dial adapted for connection to an air speed responsive device, a plurality of pointers adjustably positioned around said dial for respectively showing a safe landing speed and its upper and lower limits, and auxiliary indicating means associated with said needle, said indicating means comprising spaced electrical contacts on said shaft respectively corresponding to said upper and lower limits and the area therebetween, an indicating light for each of said contacts, and means operative through said contacts for selectively energizing said lights, whereby movement of said needle beyond said upper and lower limits and within said area causes energization of its respective light.

3. A landing speed indicator for visually presenting information as to speed and to safe landing speeds of aircraft comprising a calibrated dial face, a speed indicating pointer adapted for movement across said dial face, speed responsive means connected to said pointer through a shaft, adjustable means for selecting the upper and lower limits of an optimum landing speed, electrically conducting means on said shaft, means applying power to said conducting means, brush means mounted on said upper and lower limit adjustable means, said brush means being energized through said conducting means on said shaft when said limits have been exceeded, upper and lower limit illuminable means, and means responsive to energization of said brush means for energizing one of said illuminable means.

4. A device for indicating whether the landing speed of an aircraft is within safe limits comprising, a shaft driven by an air speed responsive device, a needle mounted on said shaft for indicating speed on a dial, conducting means imbedded in selected portions about the periphery of said shaft, brush means adjustably positioned about the periphery of said shaft, the position of said brush means about said shaft corresponding respectively to upper and lower landing speed limits, said brush means adapted to be energized through contact with said conducting means only when said upper or lower landing speed limits are exceeded, and means responsive to energization of said brush means for visually indicating speeds in excess of said limits.

5. A landing speed indicator for indicating a safe landing speed for aircraft comprising a housing containing a calibrated dial, a shaft adapted for connection to an air speed responsive device, an indicating needle supported by said shaft for registering the speed of approaching aircraft, a plurality of discs rotatably mounted in said housing, a plurality of pointers affixed to said discs for indicating on said dial face upper and lower landing speed limits, electrical brush means affixed to said discs, means on said shaft adapted to complete an electrical circuit through one of said brushes when one of said limits is exceeded and the other when another of said limits is exceeded, lamp means for indicating speeds in excess of said limits, power means, and means responsive to completion of said circuits for connecting said power means to said lamp means.

References Cited in the file of this patent

UNITED STATES PATENTS

| | | |
|---|---|---|
| 1,547,909 | Earle | July 28, 1925 |
| 1,710,499 | Lewis | Apr. 23, 1929 |
| 1,742,229 | Wood | Jan. 7, 1930 |
| 2,511,503 | Greenberg | June 13, 1950 |
| 2,677,120 | Konet | Apr. 27, 1954 |